Figure 1:
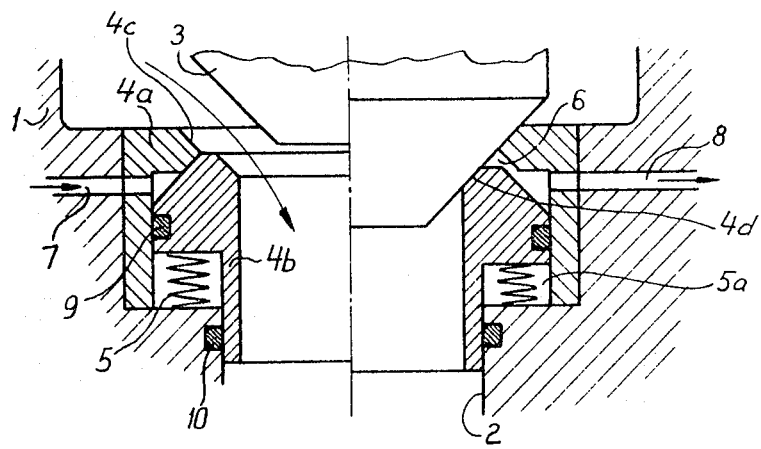

United States Patent

[11] 3,583,426

| [72] | Inventor | Vaclav Feres<br>Lund, Sweden |
| --- | --- | --- |
| [21] | Appl. No. | 816,201 |
| [22] | Filed | Apr. 15, 1969 |
| [45] | Patented | June 8, 1971 |
| [73] | Assignee | Alfa-Laval AB<br>Tumba, Sweden |
| [32] | Priority | Apr. 18, 1968 |
| [33] | | Sweden |
| [31] | | 5166/68 |

[54] ASEPTICALLY SEALING VALVE
6 Claims, 3 Drawing Figs.

[52] U.S. Cl............................................. 137/240,
251/174, 251/333, 137/628, 137/527, 137/1
[51] Int. Cl......................................... F16k 51/00
[50] Field of Search......................... 137/237,
240, 628, 516, 27; 251/174, 333

[56] References Cited
UNITED STATES PATENTS

| 691,975 | 1/1902 | Schaaf........................ | 137/240X |
| --- | --- | --- | --- |
| 1,235,409 | 7/1917 | Aldrich........................ | 137/240 |
| 1,899,154 | 2/1933 | Karrick........................ | 137/240X |
| 3,133,554 | 5/1964 | Joebken....................... | 137/240 |
| FOREIGN PATENTS | | | |
| 137,541 | 3/1930 | Sweden........................ | 137/238 |

Primary Examiner—Clarence R. Gordon
Attorney—Davis, Hozie, Faithfull and Hapgood ABSTRACT: A valve body has a closing position in which it makes sealing contact with valve seat means to close the channel therethrough; and in this closing position the valve body and seat means define a chamber surrounding the valve body and separating two areas of sealing contact between the valve body and seat means, the chamber having an inlet and an outlet for a blocking medium such as water vapor. As the valve body moves from the seat means to open the channel, the inlet and outlet for the blocking medium are automatically shut off from communication with the channel.

ASEPTICALLY SEALING VALVE

The present invention relates to a valve provided with special means for aseptically shutting off a conduit, which is required in a plant for the treatment of sterile products.

In the foodstuff industry where sterilized drinks such as milk and fruit juices are to be tapped for bottling or the like, an aseptically sealing shutoff valve is required in the conduit connecting the container for the sterilized product with the tapping point. Heretofore a rather complicated and very expensive arrangement has been required for preventing extension of bacteria through this conduit from the tapping point to the container, during periods when tapping is not going on. This prior arrangement includes two valves spaced from each other in the conduit, and pipes by which the conduit between these valves is connected to an inlet and outlet for a blocking medium, usually water vapor. After shutting off the two valves, water vapor is allowed to flow through a part of the conduit, so that an effective obstruction is provided against extension of bacteria through the conduit from the tapping point to the container.

The main object of the present invention is to provide a valve adapted to replace the above-described arrangement including two shutoff valves and two connecting points between these valves.

Another object of the invention is to provide a valve adapted to replace not only the aforesaid two shutoff valves in the previously described arrangement, but also the two shutoff valves (possibly nonreturn valves) which in the prior arrangement are required in the inlet and outlet pipes for the blocking medium.

A valve according to the invention has a valve body movable into sealing contact with a seat extending around the throughflow channel of the valve, so as to close the channel as in the case of conventional shutoff valves. In the new valve, when the valve body is thus seated in its valve-closing position, a chamber surrounds the valve body and separates two areas of sealing contact between the valve body and seat, this chamber having an inlet and an outlet for a blocking medium such as water vapor or steam. When the valve body moves from the seat to open the throughflow channel, an actuating means responsive to this opening movement causes the inlet and outlet for the blocking medium to be shut off tightly from the throughflow channel.

Preferably, the valve seat has two parts adapted to seal against the valve body in its closing position and thereby provide, respectively, the aforesaid two areas of sealing contact; and as the valve body approaches its closing position, it moves one of the seat parts relative to the other part so as to form the above-mentioned chamber separating the two areas of sealing contact. When the valve body moves from the seat to open the valve in this preferred embodiment, the actuating means (which may be a spring or springs) displace the movable part of the seat into sealing contact with the other part so that the inlet and outlet for the blocking medium are shut off tightly from the throughflow channel.

According to one embodiment of the invention, the movable part of the valve seat may be connected with or constituted by a member consisting of an elastic material, this member being in turn connected to the other part of the valve seat. In another embodiment, both parts of the valve seat may be formed by one integral piece of elastic material. In both of these embodiments a portion of the elastic material may serve as the means for actuating the movable part of the valve seat, or the elastic material may be reinforced by a spring or other means for obtaining the actuation.

If desired, the two relatively movable parts for shutting off the throughflow channel from the inlet and outlet for the blocking medium may be parts of the valve body instead of the valve seat. In either case, the two parts may be formed by two separate members of which the movable member is adapted to be resiliently pressed against the other member by any suitable actuating means.

Figure 2:
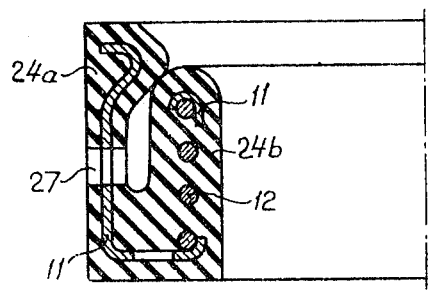
Figure 3:
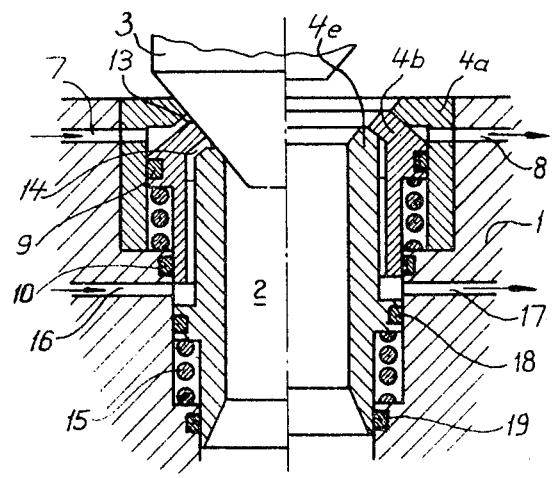

The invention is described more in detail below with reference to the accompanying drawing, in which FIG. 1 is a fragmentary vertical sectional view of one form of the new shutoff valve, the left-hand portion showing the valve when open, and the right-hand portion showing the valve when closed; FIG. 2 is a vertical sectional view of part of a modified form of the valve seat; and FIG. 3 is a fragmentary vertical sectional view of another form of the new valve, the left-hand portion showing the valve when closed, and the right-hand portion showing the valve when open.

The valve shown in FIG. 1 has a valve housing 1 and a channel 2 which extends therethrough and is arranged to be closed by means of a valve body 3 movable into tight contact with a seat consisting of two parts 4a and 4b. These seat parts are hollow so that in effect they surround the upper portion of channel 2. The seat part 4a has an annular contact surface 4c for contact with the valve body 3, this contact surface being situated radially outside a similar annular contact surface 4d on the seat part 4b. The seat part 4a is fixed in relation to the valve housing 1, while the seat part 4b is axially movable relative to the housing. By actuating means shown in the form of springs 5, the seat part 4b is pressed toward the seat part 4a so that when the valve is open (see the left part of FIG. 1), the seat parts 4a and 4b abut each other with a circumferentially sealing contact.

As can be seen from FIG. 1, the seat part 4b is arranged to be moved by the valve body 3 away from the seat part 4a when the valve is being closed, whereby an annular chamber 6 is formed by the valve body 3 and the two seat parts. Opening into this chamber are two channels 7 and 8 which constitute an inlet and an outlet, respectively, for a blocking medium, such as water vapor. When the valve is closed (i.e., when the valve body 3 contacts the two seat parts 4a and 4b), water vapor flows through the annular chamber 6 and thus effectively prevents bacteria from extending past the valve and into the conduit with which the valve is associated.

If desired, the blocking medium may also be passed through the annular chamber 5a which houses the spring means 5 and which is defined by the housing 1 and the two seat parts 4a and 4b. Two annular gaskets are shown at 9 and 10 in FIG. 1.

In FIG. 2, the valve seat there shown is formed by one integral piece of elastic material. The seat is provided with reinforcing members 11 and a spring mans 12. During closing of the valve, the seat part 24b will collapse axially, resiliently resisting the pressure by the valve body 3 (FIG. 1), so that blocking medium flowing in through the inlet 27 will be allowed to sweep over the valve body 3 around its periphery. This sweeping flow occurs through a chamber created by the collapsing of seat part 24b and which is similar to the chamber 6 in FIG. 1, the blocking medium discharging through an outlet (not shown) diametrically opposite the inlet 27. Alternatively, the seat according to FIG. 2 may be formed so that during closing of the valve the seat part 24a is pressed by the valve body radially outwards, thereby creating a chamber between the two seat parts and the valve body.

In the embodiment shown in FIG. 3, two blocking chambers 13 and 14 are formed at the valve seat when the valve is being closed. This valve differs from the valve according to FIG. 1 in having an additional seat part 4e which is situated radially inside the seat part 4b and movable relative to the valve housing 1. By spring means 15, this additional seat part 4e is actuated axially into circumferential sealing contact with the seat part 4b when the valve is opened. When the valve is being closed, the valve body 3 is moved into sealing contact with the seat parts, in the order 4e, 4b and 4a, the two first-mentioned seat parts in turn being moved relative to the subsequent seat part 4a so that interspaces are created between all the three seat parts. Blocking medium is led into the chambers 13 and 14 through channels 7 and 16, respectively, and leaves these chambers through channels 8 and 17, respectively. Sealing rings necessary for the additional seat part 4e are shown at 18 and 19.

In the above-described valves, the seat is formed so that the inlet and outlet for the blocking medium also communicate with each other through a space confined by the seat parts when the valve is open. This arrangement, enabling a continuous flow of blocking medium through the valve, sometimes may be suitable but is not absolutely necessary. That is, the movable seat part may easily be formed so that the communication between the inlet and the outlet is shut off when the valve is being opened.

A continuous throughflow of blocking medium may be suitable also in another part of the valve for aseptically shutting off another possible way for bacteria. Thus, a spindle supporting the valve body and extending from outside the valve housing into it, may be arranged to be continuously swept around by a blocking medium between two sealing rings arranged around the spindle.

The present invention may be used in connection with many different types of valves. For instance, one single valve body may be arranged to contact different seats constructed as shown in the drawing. Further, each of the movable seat parts of the valve may be actuated pneumatically instead of by mechanical spring means, in which case the blocking medium is preferably used as pressure fluid.

I claim:

1. An aseptically sealing shutoff valve comprising valve seat means defining a channel, a valve body movable to a closing position in sealing contact with the seat means to close said channel, the seat means and valve body in said closing position defining a chamber which surrounds the valve body and which separates two areas of sealing contact between the valve body and seat means, said chamber having separate from said channel an inlet and an outlet for a blocking medium, the valve body being movable from the seat means to open said channel, and actuating means responsive to said opening movement of the valve body for effecting a shutting off of communication between the channel and said inlet and outlet.

2. A valve according to claim 1, in which said seat means include two parts each coacting with the valve body in its said closing position to provide one of said two sealing contact areas, one of said parts being movable relative to the other part to form said chamber in response to movement of the valve body to said closing position, said actuating means being operable to effect said shutting off by actuating said movable part.

3. A valve according to claim 2, in which one of said parts of the seat means is an elastic member connected to the other part.

4. A valve according to claim 2, in which said actuating means include a spring operable to press said movable part against the other part of the seat means.

5. A valve according to claim 2, in which said two parts of the seat means are formed by an integral piece of elastic material.

6. A valve according to claim 1, in which said seat means include two parts each coacting with the valve body in its said closing position to provide one of said two sealing contact areas, one of said parts being movable relative to the other part of the valve body as said body moves to its said closing position, thereby forming said chamber, said actuating means being operable to force said movable part against the other part to form a circumferential seal for effecting said shutting off of communication between the channel and said inlet and outlet.